G. W. LONG.
HOUSEHOLD UTENSIL.
APPLICATION FILED SEPT. 15, 1915.

1,170,833.

Patented Feb. 8, 1916.

Inventor
G. W. LONG.
By Watson E. Coleman
Attorney

UNITED STATES PATENT OFFICE.

GEORGE W. LONG, OF MANNINGTON, WEST VIRGINIA.

HOUSEHOLD UTENSIL.

1,170,833.  Specification of Letters Patent.  Patented Feb. 8, 1916.

Application filed September 15, 1915. Serial No. 50,880.

*To all whom it may concern:*

Be it known that I, GEORGE W. LONG, a citizen of the United States, residing at Mannington, in the county of Marion and State of West Virginia, have invented certain new and useful Improvements in Household Utensils, of which the following is a specification, reference being had to the accompanying drawings.

This invention relates to certain improvements in household utensils, and it is an object of the invention to provide a device of this general character adapted to contain a liquid and having novel and improved means whereby heat may be caused to act upon the liquid within the utensil with greater facility.

Furthermore, it is an object of the invention to provide a device of this general character, preferably a wash boiler, provided with a surrounding apron whereby heat may be caused to effectively coact with the sides of the utensil to facilitate the heating of the contents of the utensil.

The invention consists in the details of construction and in the combination and arrangement of the several parts of my improved household utensil whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1:
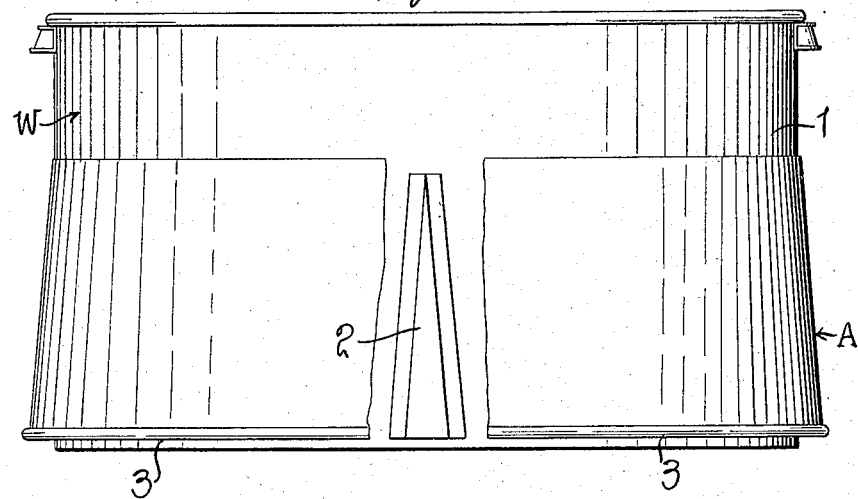
Figure 2:
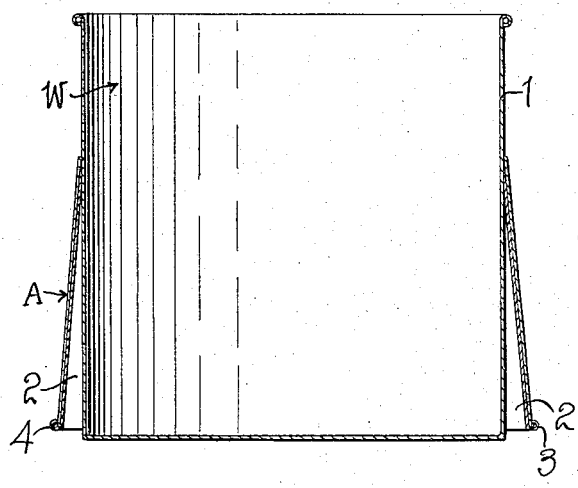
Figure 3:
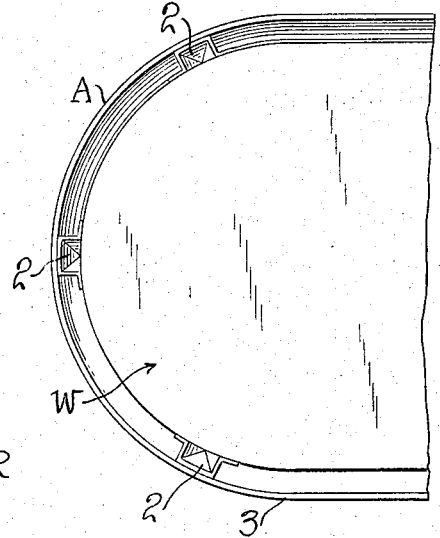

Figure 1 is a view in side elevation, with a portion broken away, of a container having an embodiment of my invention applied thereto; Fig. 2 is a transverse sectional view taken through the device as disclosed in Fig. 1; and Fig. 3 is a fragmentary view in bottom plan of the device as herein set forth.

As disclosed in the accompanying drawings, W denotes a wash boiler of conventional construction and having disposed around the side wall 1 thereof the apron A preferably formed of metal and having its upper marginal portion firmly connected throughout its length to the outer surface of the wall 1 and preferably at a point about two-thirds up from the bottom of the boiler. The apron is flared outwardly with its lower marginal portion spaced about 1½ inches from the side 1 and terminating about one-half inch above the bottom of the boiler.

In order to maintain the apron in its applied position and to give the same sufficient rigidity, I find it of advantage to employ the reinforcing ribs 2 substantially U-shape in cross section and secured both to the outer surface of the wall 1 and to the inner surface of the apron A, said members 2 being also the form of an inverted V in plan. It is also preferred that the apron A extend entirely around the boiler. I also find it of advantage to have the lower or free marginal portion of the apron A reinforced in a conventional manner by the bead 3 through which a wire strand 4 of requisite gage is disposed. In practice, I have found that the apron A serves to retain the heat thereunder and around the wall of the boiler and thus materially shortening the length of time generally employed for bringing the liquid within the boiler to the boiling point and a material saving in fuel, especially when gas is employed, is effected.

From the foregoing description, it is thought to be obvious that a household utensil constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

As a new article of manufacture, a wash boiler and an apron disposed entirely around said boiler, the upper marginal portion of the apron being permanently secured to the outer face of the side wall of the boiler at a point intermediate the height thereof, said apron being flared outwardly and terminating at a point above the bottom of the boiler, and reinforcing members substantially U-shape in cross section and in
5 the form of an inverted V in plan interposed between the apron and the boiler and disposed transversely of the apron.

In testimony whereof I hereunto affix my signature in the presence of two witnesses.

GEORGE W. LONG.

Witnesses:
E. A. MYER,
G. S. FURBEE.

Copies of this patent may be obtained for five cents each, by addressing the "Commissioner of Patents, Washington, D. C."